| United States Patent [19] | [11] 3,905,851 |
| --- | --- |
| Davis, Jr. | [45] Sept. 16, 1975 |

[54] METHOD OF MAKING BATTERY SEPARATORS

[75] Inventor: Charles Davis, Jr., Warrensville Heights, Ohio

[73] Assignee: Union Carbide Corporation, New York, N.Y.

[22] Filed: Mar. 22, 1974

[21] Appl. No.: 454,144

Related U.S. Application Data

[63] Continuation-in-part of Ser. No. 252,510, May 8, 1972, abandoned, which is a continuation-in-part of Ser. No. 159,543, June 2, 1971, abandoned.

[52] U.S. Cl. ................................. 136/131; 136/158
[51] Int. Cl. ............................................ H01m 3/02
[58] Field of Search ........ 136/131, 146, 157; 117/6, 117/75

[56] References Cited
UNITED STATES PATENTS

| 3,018,316 | 1/1962 | Higgins et al. | 136/157 |
| 3,053,691 | 9/1962 | Hartman | 117/6 |
| 3,114,651 | 12/1963 | Gentile | 117/6 |
| 3,586,539 | 6/1971 | Lauck | 136/157 |

*Primary Examiner*—Donald L. Walton
*Attorney, Agent, or Firm*—Clement J. Vicari

[57] ABSTRACT

A method of cross-linking polyacrylamide is provided which is particularly suited to the fabrication of battery separators. To an aqueous solution of polyacrylamide is added a chromium-containing compound wherein chromium is present at a valence of other than +3 and a compound which will react with said chromium containing compound to yield chromium ions at a valence of +3 which initiate cross-linking of the polyacrylamide.

8 Claims, No Drawings

METHOD OF MAKING BATTERY SEPARATORS

This application is a continuation-in-part of copending application Ser. No. 252,510 filed May 8, 1972 now abandoned which in turn is a continuation-in-part of application Ser. No. 159,543 filed July 2, 1971 and now abandoned.

The present invention relates to the manufacture of electrochemical cells and, more particularly, relates to the use of polyacrylamide as a separator material for dry cell batteries.

Dry cells are composed essentially of a consumable metal anode such as zinc, a cathode-depolarizer such as manganese dioxide and an electrolyte such as an aqueous solution containing a metallic salt of a halogen-containing acid especially, though not exclusively, a zinc salt such as zinc chloride.

The familiar Leclanche primary dry cell conventionally used as the power source in flashlights and other portable electric devices comprises a zinc anode, a cathode-depolarizer mixer cake containing manganese dioxide and a conductive material such as carbon black or graphite, and an electrolyte consisting of an aqueous solution of zinc chloride and ammonium chloride (i.e. sal ammoniac). Various corrosion inhibitors such as mercuric chloride, chromates, etc. may also be used in relatively small amounts within the electrolyte.

Another type of primary dry cell which has attracted considerable attention in recent years is the magnesium dry cell. This dry cell system is very similar to the conventional Leclanche dry cell. Basically, the magnesium dry cell comprises a magnesium anode, a cathode-depolarizer mix cake containing manganese dioxide and a conductive material, and an electrolyte. The electrolyte consists essentially of an aqueous solution containing a magnesium salt such as magnesium chloride, magnesium perchlorate or magnesium bromide.

It has also been proposed in the prior art to produce primary dry cells using a zinc anode and an aqueous zinc chloride electrolyte. Such a dry cell system differs from the conventional Leclanche dry cell mainly in the absence of ammonium chloride from the electrolyte. This dry cell system, generally referred to as an all-zinc chloride system has been found to possess a service capacity which is superior to that of the conventional Leclanche dry cell.

The term "dry cell" implies that most of the electrolyte of the cell is contained or absorbed by a layer of material interposed between the anode and cathode of the cell. This layer is generally referred to as the separator and is a physical member or structure which retains the electrolyte solution and provides a means for maintaining the anode in working engagement with the cathode and yet maintains physical separation between the anode and cathode.

It is well known in the art to fabricate dry cell separators from various gelatinous paste-type materials formed from starch, flour or methyl cellulose, which may each be used either unsupported or supported by a paper or similar backing or filler material.

Although these materials have been widely used, they are not without their disadvantages, and substitutes have long been sought. Degradation of paper liners in the presence of acid electrolyte systems has been a long standing problem.

Among the materials suggested as separator formers have been cross-linked vinyl polymers, including polyacrylamide. U.S. Pat. No. 3,018,316 to Higgins et al. discloses that hydrophilic, partially cross-linked polyacrylamide gels are useful as separators in Leclance-type dry cell batteries. The cross-linking agent disclosed and suggested for use to obtain the partially cross-linked polyacrylamide gel is formaldehyde used as formalin.

Formaldehyde, as well as many other cross-linking agents, is effective in cross-linking polyacrylamide to form a stable gel. However, difficulties have arisen in maintaining precise control over the set-up time of the cross-linked polyacrylamide since most effective cross-linking agents work too fast to yield the necessary pot life for factory mass production techniques. In addition, polyacrylamide gels formed using many of these cross-linking agents and particularly formaldehyde have had poor high temperature stability.

Particularly of relevance to the present invention, it has previously been suggested that the tri-valent chromium ion ($Cr^{+3}$) be used as a cross-linking agent for polyacrylamide. It has been found that trivalent chromium is an effective cross-linking agent, particularly when used as its chromic chloride salt. This cross-linking agent is both efficient and fast, properties which would normally be desirable in cross-linking a polymer. However, it has been found that this cross-linking agent does not permit the necessary degree of control over the cross-linking which is required for large scale battery fabrication. To optimize the utility of polyacrylamide as a separator for batteries, it is necessary that the cross-linking not go to completion and that the workable time with the polymer before gelation be substantial enough to permit large batches of the material to be compounded, stored and used in a fairly fluid state. Additionally, when it is desired to have the polyacrylamide cross-link quickly, a means should be provided for accomplishing this end.

Co-pending United States Patent Application Ser. No. 226,036 filed Feb. 14, 1972, describes some of the difficulties associated with the use of polyacrylamide in dry cell batteries and particularly points out the problems encountered in controlling the viscosity of the polyacrylamide gel during battery fabrication. It is suggested therein that control of viscosity can be maintained by starting with acrylamide monomer and carefully controlling both polymerization and cross-linking in situ, a technique which is not well suited to modern, completely mechanized, high speed battery production.

It is therefore an object of the present invention to provide a method for forming a polyacrylamide battery separator suited for use in the mass production of dry cells.

It is a further object of the invention to provide a method of fabricating battery separators of polyacrylamide which possess particular utility for use in combination with all-zinc chloride electrolytes and which display good high temperature stability.

It is a further object of the invention to provide a method for producing a battery separator from polyacrylamide in a manner such that the degree and time of cross-linking can be predetermined and precisely controlled and paper liner degradation can be kept to a minimum.

It is a further object of the invention to provide a novel method for cross-linking polyacrylamide.

The foregoing and other objects and advantages are accomplished in accordance with the present invention by providing a method for cross-linking polyacrylamide by adding to an aqueous solution of polyacrylamide a chromium-containing compound wherein a major portion of the chromium is present at a valence other than +3 and a compound which will react with said chromium-containing compound to yield chromium ions at a valence of +3. Exemplary of such compounds are potassium dichromate and potassium thiocyanate, respectively.

While the theory of this invention may not be entirely understood at present, and applicant does not desire to be limited to any theory of invention, it appears that, while the chromium ion may possess a valence of +3 or +6, only ions having the +3 valence are effective as cross-linking agents for polyacrylamide. It is possible, therefore, to have chromium ions present in a polyacrylamide solution without causing cross-linking provided the ions are at a +6 valence. The addition of a compound which will reduce the chromium +6 ion to a +3 valence will initiate cross-linking of the polyacrylamide. The cross-linking progresses only to the degree that chromium ions at a +3 valence become available, thereby giving a positive control of the degree and rate of cross-linking by controlling the number and speed at which chromium ions of +3 valence are produced. The chromium ion may also possess a valence of +2 but is unstable in this form and readily oxidized to +3 in the presence of air or in acid solution. For this reason, the chromium +2 ion is not recommended for the purposes of the present invention.

A reactive sequence of the kind described above readily lends itself to mass production techniques since one of the ingredients, namely, the compound containing chromium at a valence of +6, can be added to a polyacrylamide solution well in advance of its use. The other ingredient, namely, the compound which will react to reduce the chromium +6 ions to a valence of +3, can be selected for its speed of reaction to permit whatever degree of control is desired over the production of chromium ions at a valence of +3. In addition, choosing the best time for the addition of this single component will ensure that cross-linking starts at the most desirable time.

It will be obvious to those skilled in the art that the separator of the present invention, like the majority of battery separator materials, functions purely in a physical way and does not take part in the electrochemical reaction within the cell. For this reason the separator of the invention may be used with a wide variety of anode, cathode and electrolyte combinations, the only criterion for use being compatibility of the separator with the materials of cell construction and the products of the cell reaction. This requirement of compatibility will preclude use of the separator of the present invention with strongly alkaline electrolytes since the polyacrylamide gel will quickly degrade at a pH in the strongly alkaline range, i.e. above pH 11.

Useful anodes include but are not limited to the alkaline earth metals. Particularly preferred are anodes formed from zinc, magnesium or aluminum.

In general, useful cathode materials are metal oxides with manganese dioxide being particularly preferred.

Suitable electrolytes for use with the separator of the present invention are compatible aqueous solutions of alkali metal, alkaline earth metal, and ammonium halides and perchlorates. Aqueous solutions of zinc chloride, ammonium chloride, magnesium chloride, magnesium bromide, lithium bromide, calcium chloride, potassium bromide, sodium bromide, potassium iodide, calcium bromide, magnesium perchlorate, lithium perchlorate, potassium perchlorate, ammonium perchlorate, aluminum chloride, nickel chloride, nickel bromide, cobalt chloride, cobalt bromide, etc. are all useful.

As disclosed above, the separators of the invention are formed by cross-linking polyacrylamide. The molecular weight of the polyacrylamide useful in the invention is not narrowly critical since different applications will require separator gels with different physical properties and these can be controlled not only by choosing a higher or lower molecular weight polymer but also by cross-linking to a greater or lesser degree or by using a more concentrated or more dilute polymer solution. It will be obvious to those skilled in the art to make the modifications which may be necessary for higher or lower molecular weight polyacrylamide.

In general the molecular weight of the polyacrylamide useful in the present invention can range from less than 100,000 to greater than 10 to 20 million but preferably is in the range of 200,000 to 15,000,000. However, the most preferred separators for general purpose battery use have been made from a non-ionic homopolymer of acrylamide having a molecular weight of approximately 5 to 6 million. This material is generally commercially available under the trade name "Cyanamer" P 250 Polyacrylamide from American Cyanamid Company, Wayne, New Jersey.

The separator material of the invention is fabricated by forming an aqueous mixture of the electrolyte salts, polyacrylamide, a chromium compound having chromium present at a valence other than +3, a reducing agent for chromium and any special additives which may be desired or necessary for a particular application. These special additives may be corrosion inhibitors, bulking materials such as mineral silicates, cloth, or paper fibers, etc.

The amount of polyacrylamide useful will generally be between 1 and 20 percent by weight based on the total weight of the mixture excluding any bulking agents.

Any compound containing chromium at a valence of +6 will be useful in forming the separator of the present invention with compatibility with the other components of the cell and products of the cell reaction being the only requirement for utility. Preferred chromium compounds are those containing the $Cr_2O_7^=$ ion and include for example the alkali metal, alkaline earth metal and ammonium dichromates. Sodium dichromate, potassium dichromate, etc. are typical examples.

The reducing agent to convert the $Cr^{+6}$ ion to $Cr^{+3}$ can be any compatible compound containing anions which are more electropositive than the $Cr_2O_7^=$ ion. Examples of such compounds include the sulfite, bisulfite and thiocyanate salts of alkali metals, alkaline earth metals and ammonia.

As discussed above, a bulking material such as mineral silicates, cloth or paper fibers may be added to the separator-forming mixture. Particularly good results have been obtained with mineral silicates such as talc, fibrous talc and asbestos. Such a material adds physical strength to the resulting separator and further enhances the physical separation between the anode and cathode-depolarizer of the cell. In certain instances, such as miniature cells or those employing a relatively thick layer of polyacrylamide gel, the bulking material may be omitted. In other instances, such as a cell designed for heavy-duty use or employing a low concentration of polyacrylamide, it may be desirable to employ a substrate for the polyacrylamide gel. Suitable substrate materials are sheets of thin paper such as α-cellulose or any of the commonly used battery separator materials.

Those skilled in the art of battery fabrication will be aware of the various techniques of forming battery separators of suitable properties for any intended use from the disclosure set forth above.

The following examples are set forth as illustrative of the invention and are not intended in any manner to be limitative thereof.

EXAMPLE 1

A series of "D" size test cells were prepared employing separators in accordance with the present invention. These cells were fabricated from 10 gauge zinc cans which served as the cell anode and 52 grams of a cathode mix formulation consisting of powdered electrolytic manganese dioxide, powdered acetylene black and a 32 percent by weight aqueous zinc chloride solution in an approximate weight ratio of 6:1:3. The method of construction used was the so-called "spin paste" method. The zinc cans were individually rotated and four milliliters of separator-forming mixture were injected from a syringe into each can. Continued rotation for a few seconds caused the separator-forming mixture to uniformly coat the bottom and side of the can with excess mixture being thrown out of the can. The coated cans were then placed in an oven at 70°C. for 10 minutes to dry out the liner, α-cellulose paper liners were inserted, the cathode mix was injected into the lined cans and a carbon rod cathode collector inserted in the center of the mix. Two milliliters of 32 percent by weight aqueous zinc chloride solution were added to each cell and the cell was sealed.

The separator-forming mixture was formed from 100 milliliters of a 3 percent by weight solution of zinc chloride in water to which was added 0.40 gram of potassium dichromate, 0.40 gram of potassium thiocyanate, polyacrylamide resin and minor amounts of commonly employed corrosion inhibitors. Additionally, some of the mixtures contained talc as a bulking agent. The polyacrylamide resin used in each test cell was Cyanamer P 250 Polyacrylamide which has a molecular weight in the range of 5–6 million. Table I sets forth the composition of each of the tested separators.

Table I

Separator-Forming Mixtures

Each consisted of 4 ml of a mixture of 100 ml of 3% aqueous $ZnCl_2$, 0.40 g. $K_2Cr_2O_7$, 0.40 g. KSCN, and:

| Cell Designation | Polyacrylamide (% by weight) | Talc (% by weight) |
|---|---|---|
| A | 3 | None |
| B | 3 | 20 |
| C | 3 | 23 |
| D | 3 | 28 |
| E | 5 | None |
| F | 5 | 23 |
| G | 5 | 17 |
| H | 7 | None |
| I | 7 | 23 |
| J | 7 | 17 |

Discharge data for fresh cells using the various separator-forming mixtures of Table I continuously discharged at 25°C. is shown in Table II.

Table II 2.25 Ohm Continuous Discharge of Fresh Cells

| Cell Designation | Open Circuit Voltage (volts) | Flash Current (amps) | Closed Circuit Voltage (volts) | Service, Minutes to | | | |
|---|---|---|---|---|---|---|---|
| | | | | 1.1V. | 1.0V. | 0.9V. | 0.65V. |
| A | 1.76 | 11.3 | 1.61 | 170 | 256 | 351 | 565 |
| B | 1.75 | 9.4 | 1.60 | 183 | 295 | 415 | 595 |
| C | 1.77 | 9.0 | 1.61 | 170 | 278 | 385 | 570 |
| D | 1.76 | 9.3 | 1.61 | 179 | 285 | 404 | 618 |
| E | 1.76 | 10.4 | 1.62 | 200 | 280 | 387 | 592 |
| F | 1.75 | 9.2 | 1.59 | 195 | 320 | 422 | 608 |
| G | 1.75 | 8.9 | 1.58 | 163 | 258 | 357 | 558 |
| H | 1.76 | 10.2 | 1.61 | 183 | 274 | 373 | 570 |
| I | 1.76 | 8.8 | 1.59 | 165 | 261 | 350 | 535 |
| J | 1.63 | 9.4 | 1.50 | 192 | 305 | 420 | 650 |

From the above it can be seen that good performance is obtained from cells formed from each of the various separator forming mixtures both with and without the addition of talc. Even cell J, a relatively low voltage cell, displayed good performance for a sustained period of time.

EXAMPLE 2

A series of cells was prepared identical to those of Example 1 except that 57.4 grams of cathode mix were used and the paper liners were omitted. The composition of each of the separators is set forth in Table III.

Table III

Separator-Forming Mixtures
Each consisted of 4 ml of a mixture of 100 ml of 3% aqueous $ZnCl_2$, 0.40 g. $K_2Cr_2O_7$, 0.40 g. KSCN, and:

| Cell Designation | Polyacrylamide (% by weight) | Talc (% by weight) |
|---|---|---|
| K | 3 | 28 |
| L | 4 | 23 |
| M | 7 | 17 |
| N | 5 | 17 |
| O | 5 | 20 |

Discharge data for cells using the various separator-forming mixtures of Table III continuously discharged after one week storage at 25°C. are shown in Table IV.

Table IV

| Cell Designation | Open Circuit Voltage (volts) | Flash Current (amps) | 2.25 Ohm Continuous Discharge After One Week Storage at 25°C. | | | | |
|---|---|---|---|---|---|---|---|
| | | | Closed Circuit Voltage (volts) | Service, Minutes to | | | |
| | | | | 1.1V. | 1.0V. | 0.9V. | 0.65V. |
| K | 1.78 | 9.1 | 1.60 | 236 | 354 | 473 | 716 |
| L | 1.78 | 10.0 | 1.62 | 236 | 346 | 466 | 697 |
| M | 1.78 | 9.7 | 1.61 | 245 | 358 | 472 | 710 |
| N | 1.78 | 10.6 | 1.62 | 246 | 364 | 460 | 683 |
| O | 1.78 | 10.3 | 1.61 | 226 | 321 | 438 | 649 |

From Table IV above it can be seen that good performance is obtained from cells in accordance with the present invention even in the absence of a paper or continuous separator substrate other than that formed from the separator-forming mixture of the invention.

EXAMPLE 3

A number of D size all-zinc chloride dry cells was made in accordance with the present invention by the so-called "pasted" process. In this commonly used method of manufacture a separator-forming mixture is placed in the bottom of a zinc can and a preformed cathode-depolarizer bobbin having a carbon collector rod in its center is inserted into the can forcing the separator-forming mixture up the sides of the can to fill the void between the can and the bobbin.

The test cells were each formed in a 9 gauge zinc can which served as the cell anode. To each can was added 6 milliliters of a separator-forming mixture formed by admixing 100 milliliters of a 25 percent by weight solution of zinc chloride, 0.40 gram of potassium dichromate, 0.40 gram of potassium thiocyanate, 21 grams of talc, polyacrylamide resin and a minor amount of corrosion inhibitor. The amount of polyacrylamide employed was 4 percent by weight, based on the total weight of the other components, of a polyacrylamide homopolymer having a molecular weight of 5 to 6 million.

A cathode-depolarizer mix was fabricated from 6000 grams of natural manganese dioxide, 1500 grams of acetylene black and 4000 milliliters of a 32 percent by weight solution of zinc chloride. Forty-six grams of this mix was molded around a carbon rod to form the mix bobbin and was inserted into the zinc can containing the separator-forming mixture which was urged up the sides of the can into the void between the bobbin and the can. The cell was then closed in the conventional manner and continuously discharged at 2.25 ohms. The open circuit voltage was 1.58 volt; closed circuit voltage was 1.38 volt. The cell took 25 minutes to reach 1.1 volt, 108 minutes to reach 1.0 volt, 175 minutes to reach 0.9 volt, and 280 minutes to reach 0.65 volt.

EXAMPLE 4

A number of Leclanche cells was prepared by the pasted method described in Example 3. The cathode-depolarizer mix consisted of 46 grams of a mixture of 58.64 percent by weight natural manganese dioxide, 15 percent by weight ammonium chloride, 5.41 percent by weight zinc chloride, 8.39 percent by weight acetylene black and the balance water. The separator-forming mixture differed from that of Example 3 only in that 24 percent by weight ammonium chloride and 6.5 percent by weight zinc chloride was substituted for the 24 percent by weight zinc chloride of Example 3.

After one month storage at 25°C. the test cells displayed an open circuit voltage of 1.60 volt and a flash current of 3.4 amps. On a 2.25 ohm continuous discharge a closed circuit voltage of 1.23 volt was obtained. In 50 minutes, the voltage was 1.0 volt; 109 minutes—0.9 volt; and 200 minutes—0.65 volt.

After storage for 1 month at 71°C. similar discharge produced 1.57 volt open circuit voltage, 1.22 volt closed circuit voltage and 3.3 amps flash current. The cell took 26 minutes to reach 1.0 volt, 60 minutes to reach 0.9 volt and 162 minutes to reach 0.65 volt. Leclanche cells having a conventional paste-type separator and used as a control did not survive 71°C. storage for 1 month.

EXAMPLE 5

A test cell was prepared employing a 0.03 inch thich magnesium can anode measuring about 1 inch in diameter and 3.2 inches in length. The separator consisted of a paper liner and synthetic fiber substrate having coated thereon a separator-forming mixture formed by adding to 100 ml. of an aqueous solution of magnesium perchlorate, 4 percent by weight Cyanamer P 250 polyacrylamide, 0.4 grams of potassium thiocyanate and 0.4 grams of potassium dichromate. The mixture additionally contained 28 grams of talc per 100 grams of magnesium perchlorate solution.

The cathode-depolarizer mix consisted of an aqueous magnesium perchlorate solution, acetylene black, manganese dioxide and the commonly employed corrosion inhibitors and buffers.

This cell had a service life of 63 hours when discharged alternately on 3.55 ohms for 2 minutes and 72.5 ohms for 18 minutes to a 1.25 volt cutoff.

EXAMPLE 6

A cell identical to that of Example 5 was prepared by the spin-paste method without using the synthetic fiber substrate of Example 5. This cell had a flash current of about 12 amperes compared to only about 7 or 8 amperes for conventionally produced magnesium cells employing a magnesium perchlorate electrolyte.

It will be obvious that while the present invention has been set forth in some detail and described with particularity, it is susceptible to changes, modifications and alterations without departing from the scope of the invention as defined in the appended claims.

What is claimed is:

1. A method of forming a dry cell having an anode, a cathode and a separator interposed therebetween which comprises adding to an aqueous solution of electrolyte salts polyacrylamide, a chromium-containing compound wherein a major portion of the chromium is present at a valence other than +3, and a compound which will react with said chromium-containing compound to yield ions at a valence of +3; mixing the resultant mixture to form a separator mixture and thereafter placing said separator mixture adjacent to said anode.

2. A method according to claim 1 wherein said anode is a zinc anode and wherein said mixture is coated on the inner surface of said zinc anode prior to addition of said cathode to said cell.

3. A method according to claim 2 wherein said coating on said zinc anode is dried before addition of said cathode to said cell.

4. A method according to claim 1 wherein said anode is a magnesium anode and wherein said mixture is coated on the inner surface of said magnesium anode.

5. A method according to claim 4 wherein said coating on said magnesium anode is dried before addition of said cathode.

6. A method according to claim 1 wherein said mixture is coated on a substrate material and thereafter placed adjacent to said anode.

7. A method according to claim 6 wherein said substrate material is a synthetic fiber material.

8. A method according to claim 6 wherein said substrate material is paper.

* * * * *